United States Patent [19]

Johnson et al.

[11] 3,985,856

[45] Oct. 12, 1976

[54] REMOVAL OF IRON FROM AQUEOUS ACID SOLUTIONS CONTAINING IRON AND COPPER

[75] Inventors: Morris A. Johnson; Kang Yang, both of Ponca City, Okla.

[73] Assignee: Continental Oil Company, Ponca City, Okla.

[22] Filed: Feb. 6, 1975

[21] Appl. No.: 547,668

[52] U.S. Cl. .................................. 423/43; 423/140; 423/144
[51] Int. Cl.² ........................................ C01G 49/02
[58] Field of Search ................ 423/34, 42, 43, 143, 423/144; 204/108; 210/51; 75/108, 117

[56] References Cited
UNITED STATES PATENTS

| | | | |
|---|---|---|---|
| 2,804,375 | 8/1957 | Kamlet | 423/142 X |
| 2,959,467 | 11/1960 | Yusuf et al. | 423/144 X |
| 3,235,491 | 2/1966 | Rosenberg et al. | 210/54 X |

OTHER PUBLICATIONS

Chemical Abstracts, vol. 50, No. 3035i (1956).

*Primary Examiner*—Oscar R. Vertiz
*Assistant Examiner*—Brian E. Hearn
*Attorney, Agent, or Firm*—Richard W. Collins

[57] ABSTRACT

The present invention relates to an improved process for removing iron ions from an aqueous acid solution with a minimum removal of copper ions contained therein comprising the steps of combining an organic quaternary salt with the aqueous acid solution in an amount of at least about 0.01% by weight of said solution, adjusting the pH of the solution to a value in the range of from about 2.0 to about 2.5 so that iron ions contained in the solution are hydrolyzed and precipitated and then separating the precipitate from the solution.

5 Claims, No Drawings

REMOVAL OF IRON FROM AQUEOUS ACID SOLUTIONS CONTAINING IRON AND COPPER

BACKGROUND OF THE INVENTION

1. Field of the Invention

The present invention relates generally to an improved process for removing iron from an aqueous acid solution containing iron and copper, and more particularly, but not by way of limitation, to a process for removing iron from an aqueous sulfuric acid leach solution containing copper ions without removing substantial portions of the copper ions from the solution so that the copper ions can be subsequently efficiently recovered in an electrowinning process.

2. Description of the Prior Art

Copper hydrometallurgy has heretofore been utilized, particularly in recent years, for the recovery of copper values from low grade ores. Hydrometallurgy methods of recovering copper from ores generally avoid air pollution problems associated with heretofore used ore roasting processes, i.e., the discharge of sulfur dioxide into the atmosphere. While processes have been developed for recovering sulfur dioxide from the effluent gases produced in ore roasting, such processes generally require elaborate apparatus to carry out.

Heretofore, copper hydrometallury processes have included the steps of contacting ore containing copper with an aqueous sulfuric acid leach solution so that copper contained in the ore is dissolved by the acid. Other metals contained in the ore are also dissolved, particularly iron which is removed from the acid leach solution by precipitation as iron hydroxide. Generally, the iron precipitation is brought about by the addition of calcium carbonate to the acid leach solution. That is, calcium carbonate is added to the acid leach solution to adjust the pH thereof to a value greater than about 2.5 which causes iron contained in the solution to be hydrolyzed and precipitated. The precipitate is separated from the solution and the solution then subjected to an electrowinning process for the recovery of copper. A major drawback to this and other prior art processes is that substantial amounts of copper contained in the acid leach solution are hydrolyzed and precipitated along with iron contained therein, which copper is not recovered.

In order to overcome the loss of copper in the above-described process, the acid leach solution is often subjected to an electrowinning process for the recovery of copper prior to precipitating iron from the solution. However, this technique is also disadvantageous in that iron contained in the acid leach solution interferes with the electrowinning process making it relatively inefficient for copper recovery.

By the present invention an improved process for removing iron from aqueous acid solutions containing copper without removing a major portion of the copper therefrom is provided. The use of the process of the present invention allows the efficient removal of iron from an acid leach solution and the subsequent efficient electrowinning of copper from the solution.

SUMMARY OF THE INVENTION

The improved process of the present invention for removing iron ions from an aqueous acid solution comprises the steps of combining an organic quaternary salt with said aqueous acid solution in an amount of at least about 0.01% by weight of said solution, said organic quaternary salt having the general formula:

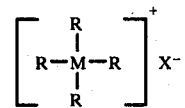

wherein:

M is nitrogen, phosphorus, arsenic, antimony or bismuth,

R represents a monovalent alkyl radical, and

X is an anion derived from organic or inorganic acids or hydroxide;

adjusting the pH of the acid solution to a value in the range of from about 2.0 to about 2.5 so that iron ions contained in the solution ar hydrolyzed and precipitated but a major portion of the copper ions contained therein remain in the solution; and then separating the precipitate from the solution.

It is, therefore, a general object of the present invention to provide an improved process for selectively removing iron from an aqueous acid solution containing iron and copper.

A further object of the present invention is the provision of an improved process for recovering copper from acid leach solutions whereby iron contained in the solution is efficiently removed prior to recovering copper therefrom.

Yet a further object of the present invention is the provision of an improved process for electrowinning copper from an acid leach solution whereby iron contained in the solution is selectively removed prior to subjecting the solution to the electrowinning process.

Other and further objects, features and advantages of the invention will be readily apparent to those skilled in the art upon a reading of the description of preferred embodiments which follows.

DESCRIPTION OF PREFERRED EMBODIMENTS

As stated above, it is known in the art to remove iron from acid leach solutions by the precipitation of ferric ions as ferric hydroxide. That is, heretofore, calcium carbonate (generally in the form of particulated limestone) has been combined with acid leach solutions to cause iron contained therein to be hydrolyzed and precipitate. However, at an acid leach solution pH less than about 2.5, the hydrolysis reaction is too slow to be practical. At a pH above 2.5, the hydrolysis reaction takes place at a fast enough rate, but substantial amounts of copper contained in the aqueous acid leach solution are also hydrolyzed and precipitated. The precipitation of copper from the solution is disadvantageous where the recovery of copper from the acid leach solution is desired.

By the present invention, an improved process for the removal of iron from aqueous acid solutions containing both iron and copper is provided whereby the iron (ferric ions) is hydrolyzed and precipitated at a rate making the process practical without substantial precipitation of copper ions contained in the solution. The process of the invention basically comprises the steps of combining a catalyst with an aqueous acid solution containing ferric ions, and copper ions in an amount of at least about 0.01% by weight of the solution, adjusting the pH of the acid solution to a value in the range of from about 2.0 to about 2.5, preferably a pH of 2.2, so that the iron ions contained in the solution are hydrolyzed and precipitated but a major portion of the copper ions contained therein remain in the solution and then separating the precipitate from the acid solution.

The organic quaternary salts which are suitable for use in accordance with the present invention are those having the general formula

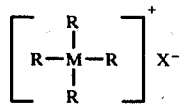

wherein:

M is nitrogen, phosphorus, arsenic, antimony or bismuth,

R represents a monovalent alkyl radical, and

X is an anion derived from organic or inorganic acids or hydroxide.

A variety of organic quaternary salts falling within the above definition can be utilized in accordance with the present invention including those wherein the alkyl radicals (R) are alike or different. The structure of the alkyl radicals can vary from methyl radicals to radicals having a high number of carbon atoms therein. Each of the alkyl radicals must have at least one carbon atom with the upper limit on the total number of carbon atoms in the radicals being limited only by suitable practical and economic considerations. Examples of suitable anions are halides, sulfate, hydrocarbon sulfonates, and acetate.

Particularly suitable such organic quaternary salts which are most preferred for use in accordance with this invention are tetramethylammonium bromide, tetra-n-butylammonium bromide, tetra-n-butylphosphonium bromide and mixtures of these compounds.

The addition of the above-described compounds to an aqueous acid solution containing ferric ions at a pH below 2.5 has been found to catalyze the hydrolysis reaction whereby iron hydroxide is precipitated from the solution at a relatively rapid rate without appreciable hydrolysis of copper ions contained in the solution. The catalyst is combined with the aqueous acid solution in an amount of at least about 0.01% by weight of the solution. At amounts below 0.01%, inadequate catalyzation of the hydrolysis reaction results. Amounts of catalyst greater than 0.01% by weight are effective and the upper limit is controlled by economic considerations. Preferably, the catalyst is combined with the aqueous acid solution from which iron ions are to be precipitated in an amount in the range of from aboaut 0.1% to about 2% by weight of the solution.

The process of the present invention is particularly well suited for removing ferric ions from aqueous sulfuric acid leach solutions used to extract copper values from ores. Such acid leach solutions are comprised predominantly of water, sulfuric acid, copper sulfate and iron sulfate. In accordance with this invention, one or more of the above-described catalysts are combined with the sulfuric acid leach solution in an amount of at least about 0.01% by weight of the solution. The pH of the solution is then adjusted by adding a base thereto to a value in the range of from about 2 to about 2.5, preferably a pH of 2.2, so that iron ions contained in the solution are hydrolyzed and precipitated but copper ions remain in the solution. When the hydrolysis reaction and precipitation of iron hydroxide is completed, the precipitate is separated from the acid leach solution and the remaining solution is subjected to a process for the recovery of copper therefrom. Various electrolysis processes for the recovery of copper from acid solutions have been developed and used heretofore which can be efficiently carried out on the acid leach solution after a major portion of iron ions contained in the solution have been removed therefrom in accordance with the process of this invention.

Particularly suitable bases for adjusting the pH of aqueous sulfuric acid leach solutions are calcium carbonate, sodium carbonate or mixtures thereof. However, other bases which are compatible with sulfuric acid leach solutions and can be added thereto to adjust the pH without precipitating copper can be utilized.

In order to more clearly illustrate the invention, the following example is given.

EXAMPLE

An aqueous solution consisting of 1% by weight copper as copper sulfate, 1% by weight iron as ferric sulfate and 1% by weight sulfuric acid was prepared in the laboratory. Test portions of the solution were brought to a pH of 2.2 by the addition of calcium carbonate thereto. The test mixtures were stirred vigorously for one hour at the temperatures indicated in Table I below, after which they were filtered to remove precipitate therefrom, the precipitate washed and the combined filtrates diluted back to the original test volumes. The filtrates produced were each tested for iron and copper concentration, the results of such tests being given in Table I below.

TABLE I

COMPARISON OF IRON PRECIPITATION FROM AQUEOUS SULFURIC ACID TEST SOLUTIONS WITH AND WITHOUT CATALYST

| CATALYST USED* | TEMPERATURE OF TEST SOLUTION, °C | IRON REMOVED FROM TEST SOLUTION IN PRECIPITATE, WEIGHT % | COPPER REMOVED FROM SOLUTION IN PERCIPITATE, WEIGHT % |
|---|---|---|---|
| Tetra-n-butylammonium bromide | 25 | 17 | 6 |
| Tetra-n-butylphosphonium bromide | 25 | 16 | 5 |
| Tetramethylammonium bromide | 25 | 0 | 5 |
| None | 25 | 3.5 | 2 |
| Tetra-n-butylammonium bromide | 80 | 27 | 6 |
| Tetra-n-butylphosphonium bromide | 80 | 23 | 5 |
| Tetramethylammonium bromide | 80 | 34 | 5 |
| None | 80 | 15 | 1 |

*1% By weight

From Table I, it can clearly be seen that the presence of the catalysts of this invention in the aqueous sulfuric acid test solutions resulted in the precipitation of increased quantities of iron hydroxide with little precipitation of copper as compared to the precipitation of iron hydroxide without the catalysts.

The present invention, therefore, is well adapted to carry out the objects and attain the ends and advantages mentioned as well as those inherent therein. While presently preferred embodiments of the invention have been given for the purposes of this disclosure, numerous changes in the process of the invention can be made by those skilled in the art. For example, the catalysts of the invention can be added to the aqueous acid solution before or after adjusting the pH thereof to the desired range.

What is claimed is:

1. A process for removing ferric ions from an aqueous acid solution without removing a substantial portion of copper ions contained therein comprising the steps of:

combining with said aqueous acid solution in an amount of at least 0.01% by weight of said solution a compound soluble in said aqueous acid solution having the general formula

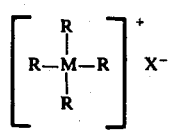

wherein:
M is nitrogen or phosphorus,
R is butyl, and
X is an anion derived from organic or inorganic acids or hydroxide;

adjusting the pH of said acid solution to a value in the range of from about 2.0 to about 2.5 so that a substantial amount of ferric ions contained in said solution are hydrolyzed and precipitated but a major portion of the copper ions contained therein remain in said solution; and then separating the precipitate from said acid solution.

2. The process of claim 1 wherein said compound is selected from the group consisting of tetra-n-butylammonium bromide, tetra-n-butylphosphonium bromide and mixtures thereof and is combined with said acid solution in an amount in the range of from about 0.1% to about 2% by weight of said solution.

3. The process of claim 1 wherein the pH of said solution is adjusted by combining a base therewith selected from the group consisting of calcium carbonate, sodium carbonate and mixtures thereof.

4. The process of claim 3 wherein said base is calcium carbonate.

5. The process of claim 1 wherein said aqueous acid solution is an aqueous sulfuric acid leach solution.

* * * * *